(12) United States Patent
Buchan et al.

(10) Patent No.: US 6,933,648 B2
(45) Date of Patent: Aug. 23, 2005

(54) ROTOR ASSEMBLY FOR DYNAMO ELECTRIC MACHINES

(75) Inventors: Neil Fergus Buchan, Buckinghamshire (GB); Joseph Paul Fakult, Willoughby Hills, OH (US)

(73) Assignee: Goodrich Control Systems Limited (GB)

( * ) Notice: Subject to any disclaimer, the term of this patent is extended or adjusted under 35 U.S.C. 154(b) by 0 days.

(21) Appl. No.: 10/876,253

(22) Filed: Jun. 24, 2004

(65) Prior Publication Data

US 2004/0263019 A1 Dec. 30, 2004

(30) Foreign Application Priority Data

Jun. 24, 2003 (GB) .............................................. 0314636

(51) Int. Cl.[7] .............................................. H02K 3/48
(52) U.S. Cl. ...................................... 310/214; 242/433
(58) Field of Search .............................. 310/214, 216; 242/433, 433.4, 448

(56) References Cited

U.S. PATENT DOCUMENTS

| | | | | |
|---|---|---|---|---|
| 3,008,786 A | * | 11/1961 | Costello ..................... | 310/214 |
| 5,140,204 A | * | 8/1992 | Cashmore et al. ............ | 310/61 |
| 6,113,024 A | * | 9/2000 | Pittard et al. ................ | 242/433 |
| 6,225,723 B1 | * | 5/2001 | Cooper et al. .............. | 310/214 |
| 6,313,561 B1 | | 11/2001 | Wang et al. | |

FOREIGN PATENT DOCUMENTS

| | | |
|---|---|---|
| DE | 20 07 735 | 9/1970 |
| EP | 1 005 135 | 5/2000 |

* cited by examiner

Primary Examiner—Tran Nguyen
(74) Attorney, Agent, or Firm—Andrus, Sceales, Starke & Sawall, LLP

(57) ABSTRACT

A rotor assembly for a dynamo electric machine, the rotor assembly comprising a rotor core incorporating radially extending rotor poles, rotor windings encircling respective rotor poles, circumferentially extending pole tips at the outer end of each pole respectively, said tips overlying the rotor winding encircling the respective pole, a plurality of rotor slot closure members, each closure member spanning the gap between a pair of adjacent poles, and including lateral flanges interposed between the respective rotor windings and the associated pole tips, a spacer member positioned beneath each closure member and engaging the radially extending faces of the adjacent windings, and, a locking wedge assembly comprising a pair of locking wedges extending axially of the rotor assembly between each closure member and the associated spacer, the locking wedges extending with their tapers in opposite directions so that moving the wedges longitudinally towards one another increases the radial dimension of the combination of the locking wedges driving the associated spacer and closure apart in a radial direction. Also disclosed is a method of manufacturing a rotor assembly.

12 Claims, 4 Drawing Sheets

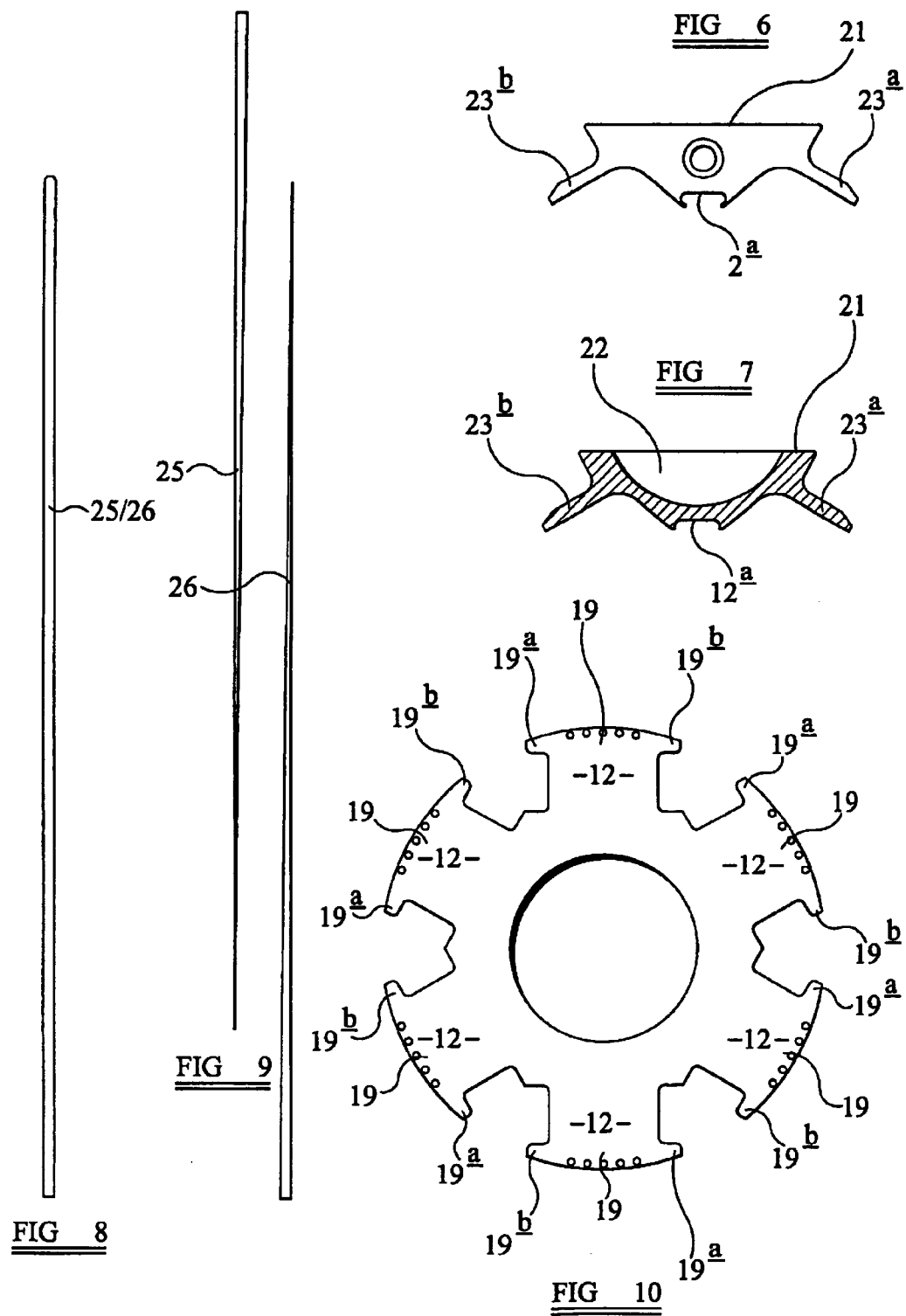

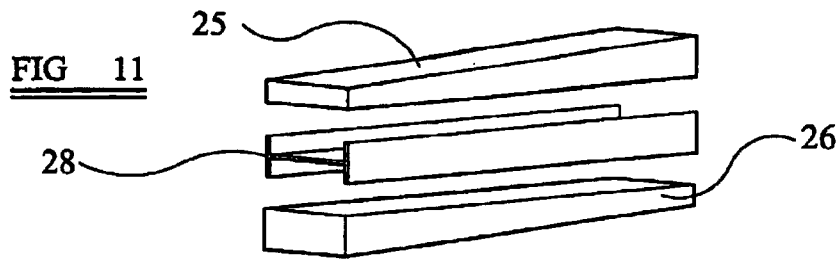
FIG 11
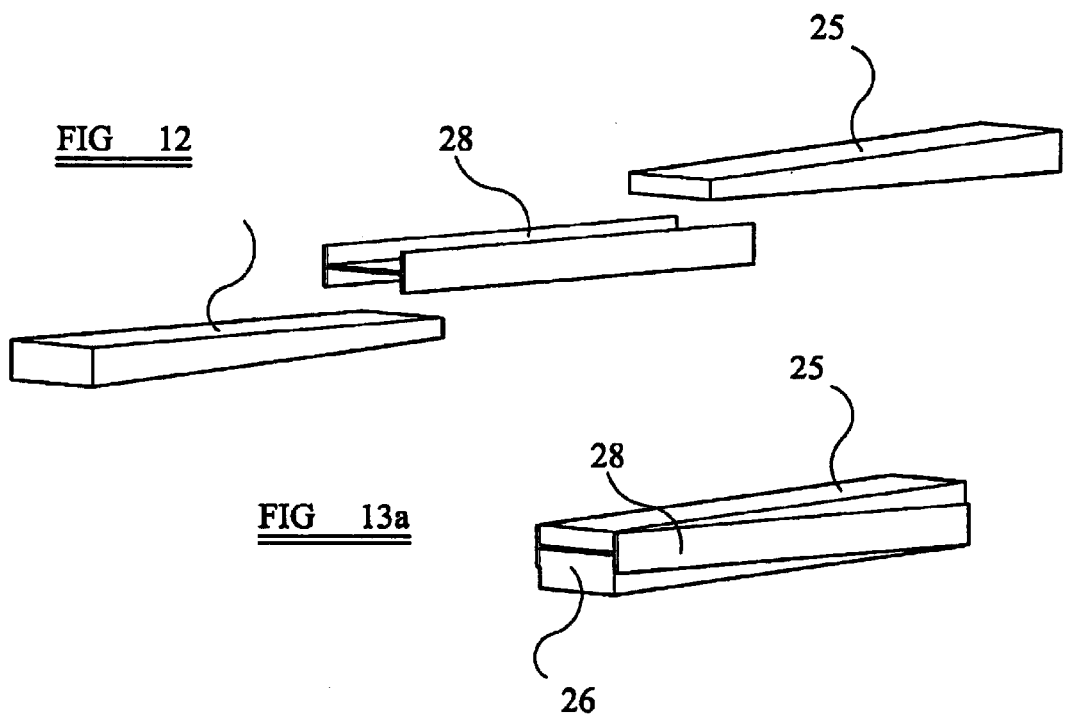
FIG 12
FIG 13a
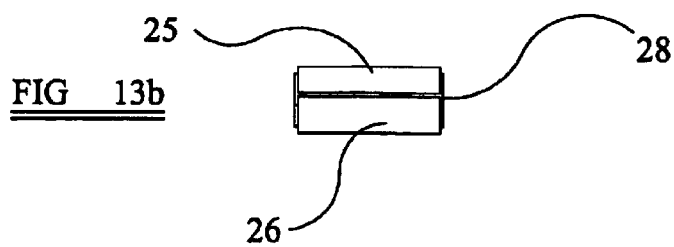
FIG 13b

ROTOR ASSEMBLY FOR DYNAMO ELECTRIC MACHINES

TECHNICAL FIELD

This invention relates to a high rotational speed rotor assembly for a dynamo electric machine, particularly, but not exclusively, a high rotational speed generator for use in conjunction with an aircraft gas turbine engine, and to a method of manufacturing such a rotor assembly.

BACKGROUND ART

A recognised problem in the construction of dynamo electric machine rotors, is that the rotor windings, which encircle the radially extending poles of the rotor, must be held securely within the rotor core not only against vibration, but more particularly against centrifugal forces which are exerted on the windings throwing the windings radially outwardly as the rotor rotates. These problems are recognised in high speed machines where the rotor rotates very rapidly, and are exacerbated by increasing the rotor diameter for example to increase the power output of a generator.

The poles of the core of the rotor extend radially outwardly with respect to the rotational axis of the rotor, and as the poles are of substantially constant thickness (measured in a circumferential direction) the rotor slots (the gaps between circumferentially adjacent poles) increase in width from a minimum adjacent the roots of the poles towards a maximum adjacent the radially outermost ends of the poles. The windings encircling the poles occupy part of the tapering slot between adjacent poles, and it is usual to provide the free ends of the poles with circumferentially extending pole tips which overlie, at least in part, the windings.

It is known to locate the windings radially by means of a slot closure member usually referred to as a wedge, which fits across the gap between circumferentially adjacent poles, the member seating beneath the mutually presented pole tips of the two adjacent poles and engaging the radially outward ends of the windings between adjacent poles so as to distribute the circumferential loading, in use, imposed upon the closure member by the windings, into the pole tips. Furthermore, it is also known to introduce a spacer of V-shaped cross-section between the adjacent windings and beneath the aforementioned wedge, to assist in circumferential location of the windings.

DISCLOSURE OF THE INVENTION

In accordance with a first aspect of the present invention there is provided a rotor assembly for a dynamo electric machine, the rotor assembly comprising a rotor core incorporating radially extending rotor poles, rotor windings encircling respective rotor poles, circumferentially extending pole tips at the outer end of each pole respectively, said tips overlying the rotor winding encircling the respective pole, a plurality of rotor slot closure members, each closure member spanning the gap between a pair of adjacent poles, and including lateral flanges interposed between the respective rotor windings and the associated pole tips, a spacer member positioned beneath each closure member and engaging the radially extending faces of the adjacent windings, and, a locking wedge assembly comprising a pair of tapering locking wedges extending axially of the rotor assembly between each closure member and the associated spacer, the locking wedges extending with their tapers in opposite directions so that moving the wedges longitudinally towards one another increases the radial dimension of the combination of the locking wedges driving the associated spacer and closure apart in a radial direction.

In accordance with a second aspect of the present invention there is provided a method of manufacturing a rotor assembly for a dynamo electric machine comprising, starting with a rotor core including a plurality of circumferentially spaced radially extending poles encircled by respective rotor windings, a respective spacer received in the gap between the windings of each circumferentially adjacent pair of windings, a respective closure member circumferentially spanning the gap between the poles of each adjacent pair of poles, each closure member including lateral flanges received between a respective winding and the underside of a respective circumferentially extending pole tip, and the method including introducing a respective locking wedge assembly between each spacer and its associated closure, each locking wedge assembly comprising first and second elongate tapering wedges with their tapers extending in opposite directions axially of the rotor assembly, said first and second wedges having their taper arranged radially of the rotor assembly, the first wedge having a face in contact with the respective closure member, the second wedge having a face in contact with the respective spacer, and the two wedges having their opposite face in sliding contact, and, driving the wedges axially of the rotor assembly to move their wider ends towards the transverse median plane of the rotor assembly so as to urge the respective closure member and the respective spacer radially apart.

Conveniently the locking wedges are each received in an elongate channel formed in the respective closure member and spacer.

Alternatively the locking wedges are each received in respective elongate oppositely facing channels formed in a respective elongate alignment member interposed between the respective closure member and spacer.

Preferably said closure members and said spacers are equal in length to the axial length of the poles of the rotor core, and said first and second locking wedges are initially of a length exceeding the axial length of the poles, the dimensions of the wedges, the closure members and the spacers being such that the first and second wedges are inserted substantially completely through the axial length of the rotor before significant radial force is applied to the respective spacer and closure member, the wedges then being pressed further to load the respective spacer and the respective closure member radially apart and subsequently trimming the protruding regions of the first and second wedges, at both axial ends of the rotor assembly, to be substantially flush with the axial ends of the spacers and closure members.

Desirably a wedge insertion apparatus applies a predetermined force simultaneously to the wider ends of the first and second wedges of each wedge assembly to drive the wider ends of the first and second wedges towards one another, the predetermined force applied simultaneously to both wedges being calculated to move the wedges to a position in which a predetermined desired radial loading is applied to the respective spacer and closure member.

Desirably the first and second wedges are formed from a carbon fibre composite material.

Preferably the first and second wedges each have a 2° taper over their whole length.

Preferably a single wedge shaped blank is cut to produce substantially identical first and second wedges.

BRIEF DESCRIPTION OF THE DRAWINGS

One example of the invention is illustrated in the accompanying drawings wherein:

FIG. 6 is an end elevational view of a closure member of the rotor assembly of FIGS. 1 and 2, FIG. 7 is a transverse cross-sectional view of the closure member of FIG. 6, FIG. 8 is a plan view of a locking wedge of the rotor assembly, FIG. 9 is a side elevational view of a pair of locking wedges of the rotor assembly, FIG. 10 is a plan view of one of the laminae of the rotor assembly, FIGS. 11 and 12 are oppositely exploded perspective views of a modification of the wedge assembly, and, FIGS. 13a and 13b are perspective and end views respectively of the wedge assembly of FIGS. 11 and 12 in an operative state.

PREFERRED MODES OF CARRYING OUT THE INVENTION

Figure 1:
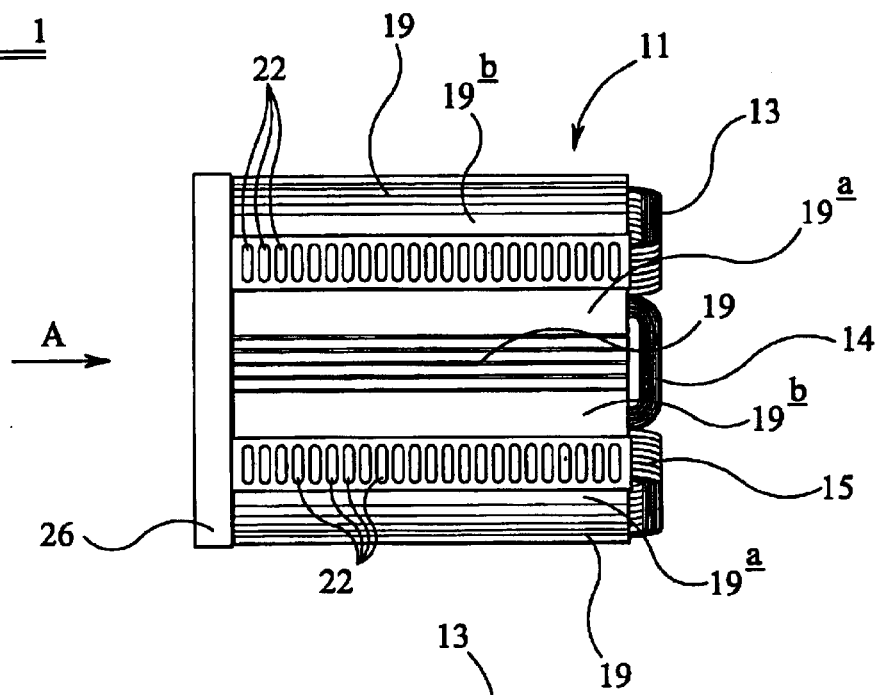
FIG. 1 is a diagrammatic side elevational view of a rotor assembly of a high speed dynamo electric machine with parts thereof omitted for clarity.

Referring to the drawings, the rotor assembly includes an elongate generally cylindrical body or rotor core which, in use, is mounted on a rotor shaft for rotation therewith about the axis of the rotor shaft within a corresponding stator assembly. The construction of the rotor core is not of particular significance to the present invention, and it will be recognised that the rotor core may be formed from a plurality of laminae if desired. The rotor core described herein is laminated and FIG. 10 illustrates one of the laminae, a plurality of which are stacked in face to face alignment and secured together in a conventional manner. The rotor core includes six equiangularly spaced radially extending integral poles 12 two of which are seen in part in FIG. 3 where they are identified by the reference numerals 12a and 12b respectively. The poles 12 are of rectangular cross-section and so define between them generally V-shaped rotor slots.

Figure 2:
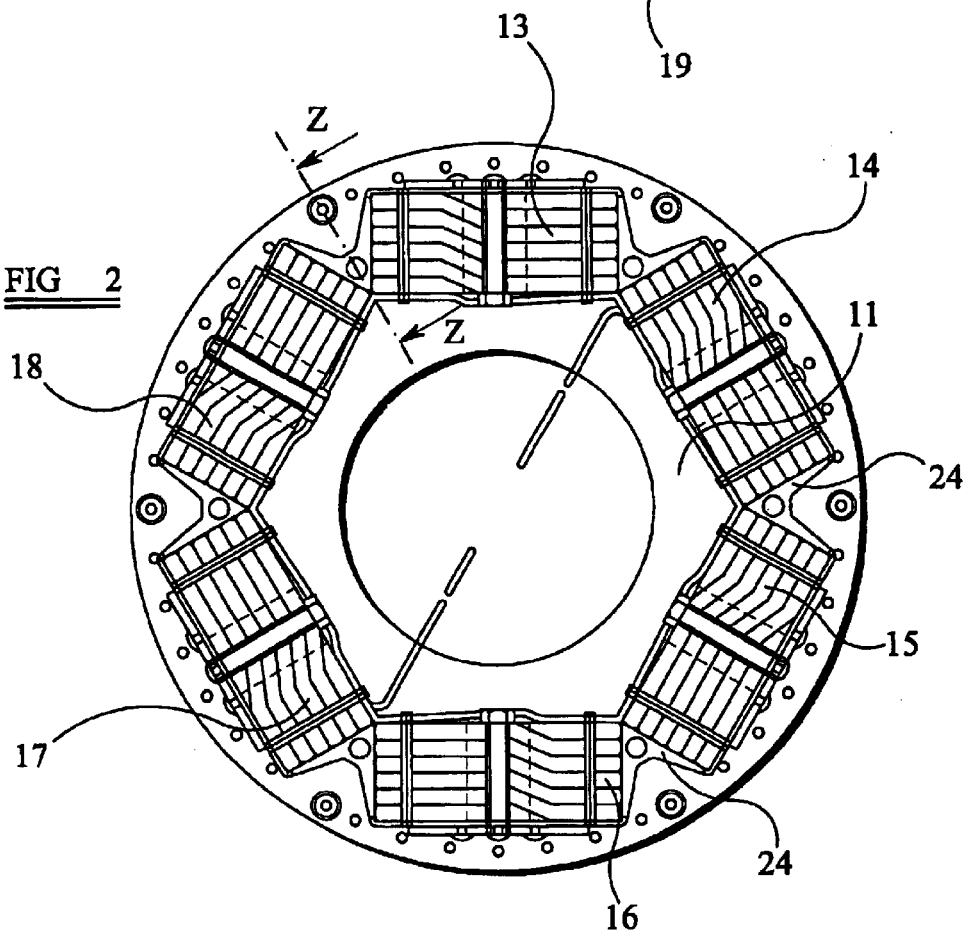
FIG. 2 is a view in the direction of arrow "A" in FIG. 1 to an increased scale.

Each pole is encircled by a rotor winding and thus the axially extending regions of adjacent rotor windings occupy opposite sides of the V-shaped rotor slot. The six rotor windings are illustrated in FIG. 2 where they are indicated by the reference numerals 13, 14, 15, 16, 17, 18 respectively, and in FIG. 3 the axial regions of the windings 13 and 18 which occupy the same rotor slot between the poles 12a, 12b are identified as 13a and 18b respectively. The exact nature of the rotor windings is not of significance to the present invention but it can be seen that the turns of the rotor windings are formed from copper strip of rectangular cross-section, and are packed to form a winding of rectangular cross-section. The windings seat against the radially extending faces of their respective poles and it can be seen from FIG. 3 that the base of each rotor slot has a respective surface region 11a, 11b extending at right angles to a respective pole and against which the base of the respective winding seats.

At their radially outermost ends the poles 12 include integral pole ends 19 which define the outer circumferential surface of the rotor body, being parts of a cylinder having its axis coincident with the axis of rotation of the rotor body. The shaping of the pole ends 19 extends through the full axial length of the poles 12 and the pole ends are extended beyond the side walls of their respective poles in a circumferential direction to define laterally extending pole tips 19a, 19b which extend outwardly over the respective rotor windings throughout the whole axial length of the poles, and partially close the respective rotor slot.

Figure 3:
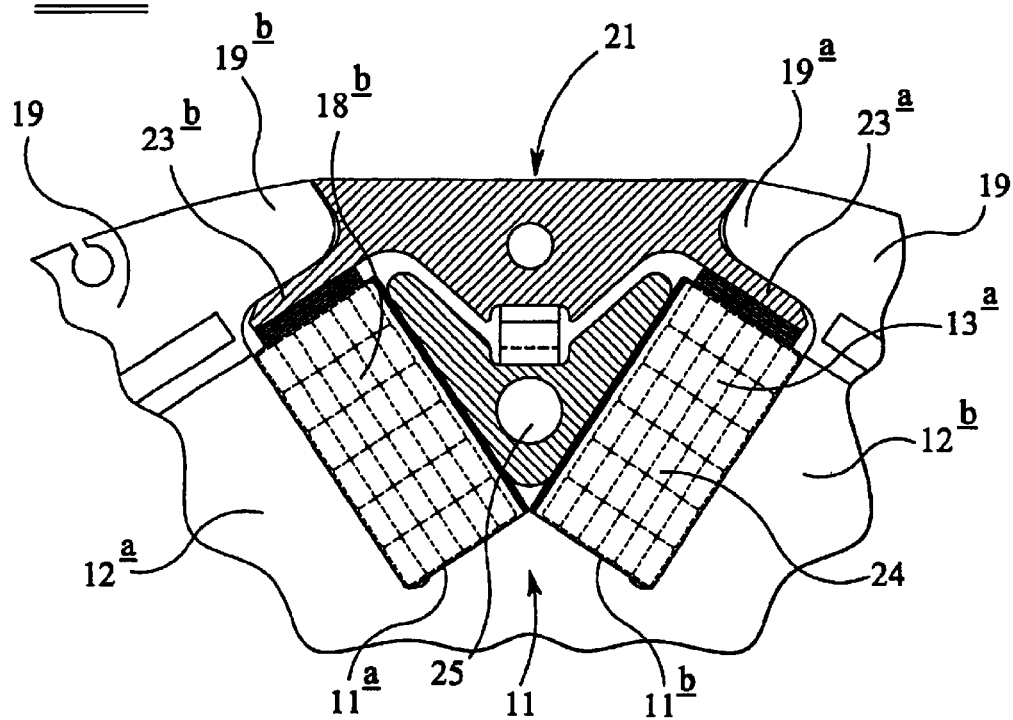
FIG. 3 is an enlarged sectional view of part of FIG. 2.

The pole tips 19a, 19b do not completely overlie the respective rotor windings, and in order to hold the rotor windings in place against radially outward movement and centrifugal force as the rotor rotates, there is provided, within each rotor slot, a rotor slot closure member 21 (best seen in FIGS. 3, 6 and 7). Such rotor slot closure members are sometimes referred to in the art as "wedges".

Each closure member 21 is elongate, having a length equal to the axial length of the poles 12 of the rotor. Each closure member is formed from a material of high strength and relatively low weight, for example titanium, and although each closure member 21 is of substantially uniform cross-section along the whole of its length it is apparent from FIGS. 1 and 7 that recesses 22 extend into the central portion of the closure member, from the exterior surface thereof, at a plurality of points spaced along the length of the closure member to minimise the weight of the closure member without significantly impairing its strength. The cross-sectional shape of each closure member 21 is generally triangular, the base of the triangle being the outermost face of the closure member and the apex of the triangle extending downwardly into a respective slot and being truncated. Each closure member is recessed along its lateral edges to receive the respective pole tips 19a, 19b on opposite sides of the rotor slot spanned by the closure member, and the closure member includes integral lateral outwardly extending flanges 23a, 23b which extend beneath the respective pole tips 19a, 19b and lie between the pole tips and their respective rotor windings, the flanges 23a, 23b being angled accordingly, so as to extend substantially at right angles to the adjacent poles 12a, 12b. The truncated apex of each closure member 21 is shaped to define a rectangular cross-section groove extending the full length of the closure member and having a base wall 21a which is, in use, at right angles to a radially extending plane bisecting the respective rotor slot along its length.

Figure 5:
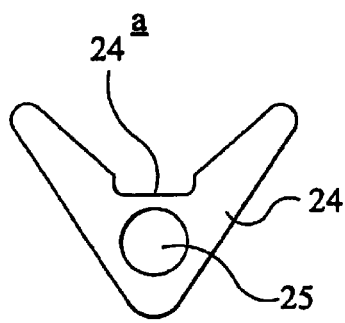
FIG. 5 is an end elevational view of a spacer of the rotor assembly of FIGS. 1 and 2.

Received within the triangular void between the windings in each rotor slot and the underside of the closure member 21 is a spacer 24 of chevron shaped cross-section (best seen in FIGS. 3 and 5). Each spacer 24 is elongate, being equal in length to the length of the poles 12 of the rotor and is conveniently formed from aluminium. Each spacer 24 may be a length cut from an aluminium extrusion, and for weight reduction purposes each spacer 24 has a longitudinally extending through bore 25. The outer longitudinally extending faces of the spacer 24 are inclined to one another at an angle equal to the angle subtended between the axes of adjacent poles 12 and the dimensions of each spacer 24 are such that the spacer is received between windings of a rotor slot with its outer faces engaging the respective windings along their axial length. The apical edge of the spacer 24 is rounded, and lies adjacent the base of the respective slot, the divergent limbs of the spacer 24 extending outwardly in facial contact with the respective windings (13 and 18 in FIG. 3), terminating adjacent the underside of the respective closure member 21. Between its respective limbs each spacer member 24 defines a longitudinally extending channel of rectangular cross-section the base wall 24a of which lies parallel, in use, to the base wall 21a of the channel of the associated closure member 21. The walls 24a, 21a are spaced radially of the rotor assembly from one another.

The closure member 21 and the associated spacer 24 will be inserted into each rotor slot in an axial direction, firstly sliding the spacer 24 into place and then introducing the closure member 21. Although the flanges 23a, 23b of the closure member 21 are a relatively tight fit between the underside of the pole tips 19a, 19b and the windings, there is little danger of damaging the windings by introducing the closure member 21 axially since the windings are protected by an outer insulating layer formed from an insulating lacquer, an insulating wrapping or both and by overlying insulating spacer strips, which can withstand the insertion of the closure member 21.

In order to lock each closure member 21 and its associated spacer 24 in a respective rotor slot there is provided a locking wedge assembly comprising first and second elongate wedges 25, 26. The wedges 25, 26 are identical conveniently being formed by cutting from a single common blank. Desirably the wedges are formed as carbon fibre composites, and a single carbon fibre composite blank may be sliced to produce two or more identical wedges. By producing the wedges from a single blank the possibility of dimensional differences between the two wedges of a pair of wedges is greatly minimised.

Initially each wedge 25, 26 is significantly longer than the axial length of the poles 12, closure members 21 and spacers 24. Conveniently each wedge 25, 26 is at least twice the length of the poles. Thus where, as in the example illustrated in the drawings the poles, closure members and spacers are 165 mm (6½ inches) long then each of the wedges 25, 26 will initially be at least 330 mm (13 inches) in length. The wedges 25, 26 are inserted narrow end first into the gap between the walls 21a, 24a of the associated closure member 21 and spacer 24 respectively. The wedge 25 is introduced from one axial end of the rotor while the wedge 26 is simultaneously introduced from the opposite axial end of the rotor. Furthermore, the wedges are orientated such that their increasing thickness is disposed radially of the rotor assembly. The wedges 25, 26 are pushed simultaneously towards one another, so their thickest ends move axially towards the transverse median plane of the rotor assembly.

The dimensions of the respective spacer 24 and closure member 21 are such that at approximately the point at which the narrowest ends of the wedges protrude from the opposite axial ends of the rotor the action of the tapering wedges sliding over one another will have pushed the base walls 21a and 24a radially apart by an extent such that the spacer 24 firmly engages the windings of its associated slot and the flanges 23a, 23b of the closure member are firmly engaged with the under-surface of their respective pole tips 19a, 19b. Thus at this point there is no free play in a radial direction, but no significant clamping pressure has been generated by the wedges 25, 26. Thereafter loading is applied to the wider ends of the wedges 25, 26 simultaneously so that the wedges are pushed further through the rotor assembly, and the radial "expansion" of the wedge assembly which is consequent upon the further movement of the wedges loads the spacer 24 against the respective rotor windings while simultaneously loading the flanges 23a, 23b of the associated closure member against the pole tips 19a, 19b. The loading applied simultaneously to the two wedges 25, 26 is limited to a predetermined value so as to limit the loading of the spacer 24 against the windings and the closure member 21 against the pole tips. Conveniently no more than about 445 Newtons (100 lbs force) is applied to the ends of the wedges 25, 26, and desirably the force is limited to about 356 Newtons (80 lbs force). Exceeding these values risks loading the closure member 21 sufficiently to overstress the pole tips 19a, 19b, but these values may not be appropriate in all applications and the actual values can easily be determined by the skilled man.

The locking force applied by the wedges 25, 26 locks the spacer 24, the closure member 21, and the windings 13–18 rigidly in place, sufficiently tightly to accommodate vibration, and centrifugal force even at the high rotational speeds to which the rotor will be subjected in use.

Figure 4:
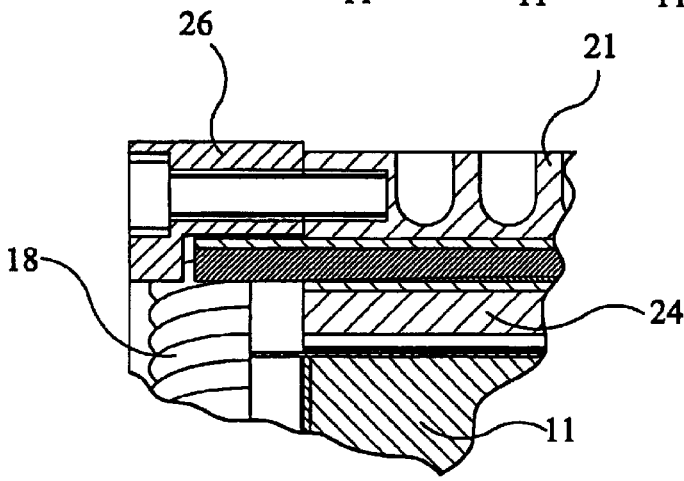
FIG. 4 is a cross-sectional view on the line Z—Z in FIG. 2.

After the wedges 25, 26 have moved as far as is necessary for the maximum predetermined loading axial force on the wedges to be achieved, the parts of the wedges protruding at both axial ends of the rotor are trimmed to remove both the narrower and thicker protruding ends of both wedges and to leave the ends of the wedges protruding slightly beyond the ends of the respective closure member 21 and spacer 24 (see FIG. 4). Thereafter an end band in the form of a metal annulus 26 is attached to each axial end of the rotor assembly to overlie the trimmed ends of the wedges. 25, 26 and so prevent the wedges "backing-out" as might otherwise occur as a result of vibration in use. Only one end band 26 is shown in FIG. 1, the other end band having been omitted for clarity. As is apparent from FIG. 4, the end bands 26 are secured in position by cap screws extending through the end bands and threaded into the end regions of the closure members 21. Trimming the wedges to leave a small protrusion at both ends of the rotor core facilitates extraction of the wedges for servicing/repair of the rotor assembly if necessary. It is to be understood however that the wedges could be trimmed substantially flush with the ends of the rotor core if desired.

It will be recognised that as the locking wedges 25, 26 have identical and complementary taper angles the combined action of the two wedges 25, 26 acting between the respective spacer 24 and closure member 21, provides a radial expansion in a uniform manner applied simultaneously along the whole length of each spacer 24 and associated closure member 21. The expansion force provided by the co-action of the two wedges is thus not applied at discrete locations, but is applied simultaneously and uniformly along the whole length of the rotor assembly. It follows therefore that the loading applied by the spacer 24 to the windings and the closure member 21 to the pole tips is also applied uniformly, and simultaneously along the whole axial length of the rotor. There is little risk of damage to the winding insulation during the radial expansion of the locking wedge assembly 25, 26 since the actual movement of the spacer 24 relative to the windings during this process is negligible.

Carbon fibre composite has been identified as the material of choice for the wedges 25, 26 as it lends itself to the production of accurately identical wedges. It is to be understood however that other materials could be utilised if desired.

The combination of closure member 21, spacer 24, and wedges 25, 26 is particularly suited to a rotor assembly which is of greater axial length than is conventional. For example, the arrangement has been tested on six pole rotors having an axial length of 165 mm (6.5 inches) and has found to be particularly effective, notwithstanding the fact that the available slot dimensions to accommodate the assembly is significantly reduced on a six pole machine of the kind illustrated (by comparison with the more conventional four pole machine) and notwithstanding the increased axial length, and therefore increased rotating mass.

Desirably, the wedges 25, 26 are initially twice the length of the rotor assembly, and have a taper angle of 2° being 1 mm thick at their thinner ends. It is to be understood however that it is not essential that the wedges are twice the axial length of the rotor, and shorter or longer wedges could be provided if desired. It must be recognised however that in order that the loading applied by the radial expansion of the wedge assembly 25, 26 is applied uniformly and simultaneously along the whole axial length of the rotor the two wedges must be overlapping throughout the whole axial length of the rotor at the point at which a significant loading is applied by the expansion of the wedge assembly. Thus although the wedges may be less than two times the axial length of the rotor it is to be understood that they will still have an initial length exceeding the axial length of the rotor so that both ends of each wedge protrude from the axial ends of the rotor when the predetermined axial force has been applied to the wedges.

In the modification shown in FIGS. 11, 12 and 13, the locking wedge assembly further comprises an alignment member 28. The alignment member 28 is elongate, corresponding in length to the axial length of the poles 12 of the rotor. The member 28 is of 'I'-shaped cross-section, thus providing two oppositely facing elongate channels in which the two wedges 25, 26 can be placed respectively. FIG. 12 shows how the wedges 25, 26 are arranged, one on either side of the alignment member 28. When the wedges are orientated, one on either side of the alignment member 28, such that the thickest end of one wedge is located adjacent to the thinnest end of the other wedge, the uniform radial expansion of the wedge assembly as described above is preserved, as shown in FIGS. 13a and 13b.

In use, the alignment member 28 is inserted into the gap between the walls 21a, 24a of the associated closure member 21 and spacer 24 respectively fitting into the channels formed in the member 21 and spacer 24, before insertion of the narrow ends of the wedges 25, 26 into the opposite ends respectively of their respective channel of the member 28.

The member 28 is of particular benefit in rotor assemblies where the members 21 and spacers 24 are not formed with channels the bases of which define the walls 21a and 24a, since it will fit in the gap between the respective member 21 and its associated spacer 24, and will provide its own channels guiding the longitudinal movement of the wedges 25, 26 relative to one another in use, and preventing lateral dislocation of the wedges relative to one another as could otherwise occur.

Moreover the provision of members 28 is similarly beneficial in rotor assemblies where the channels in the members 21 and spacers 24 are too wide relative to their respective wedges 25, 26 to guide the wedges in their respective sliding movement, in that again each member 28 will restrain its respective wedges 25, 26 relative to one another during their longitudinal sliding movement. Thus, although lateral alignment of the wedges 25, 26 would normally be difficult in such situations, lateral displacement of the wedges 25, 26 during their longitudinal displacement to expand the assembly is prevented over the entire axial length of engagement by utilisation of an alignment member 28. It will be recognised that whereas without the member 28 the wedges are in physical sliding contact with one another, where the member 28 is provided a common base wall of the channels of the member 28 spaces the wedges 25, 26 apart but the mechanical effect of moving the wedges longitudinally is identical.

What is claimed is:

1. A rotor assembly for a dynamo electric machine, the rotor assembly comprising a rotor core incorporating radially extending rotor poles, rotor windings encircling respective rotor poles, circumferentially extending pole tips at the outer end of each pole respectively, said tips overlying the rotor winding encircling the respective pole, a plurality of rotor slot closure members, each closure member spanning the gap between a pair of adjacent poles, and including lateral flanges interposed between the respective rotor windings and the associated pole tips, a spacer member positioned beneath each closure member and engaging the radially extending faces of the adjacent windings, and, a locking wedge assembly comprising a pair of tapering locking wedges extending axially of the rotor assembly between each closure member and the associated spacer, the locking wedges extending with their tapers in opposite directions so that moving the wedges longitudinally towards one another increases the radial dimension of the combination of the locking wedges driving the associated spacer and closure apart in a radial direction.

2. A rotor assembly as claimed in claim 1 wherein the locking wedges are each received in an elongate channel formed in the respective closure member and spacer.

3. A rotor assembly as claimed in claim 1 wherein the locking wedges are each received in respective elongate oppositely facing channels formed in a respective elongate alignment member interposed between the respective closure member and spacer, the wedges being in sliding contact with each other through the intermediary of a dividing wall of the alignment member.

4. A rotor assembly as claimed in claim 1 wherein said closure members and said spacers are equal in length to the axial length of the poles of the rotor core, and said first and second locking wedges are initially of a length exceeding the axial length of the poles.

5. A rotor assembly as claimed in claim 1 wherein the first and second wedges are formed from a carbon fibre composite material.

6. A rotor assembly as claimed in claim 1 wherein the first and second wedges each have a 2° taper over their whole length.

7. A rotor assembly as claimed in claim 1 wherein a single wedge shaped blank is cut to produce substantially identical first and second wedges.

8. A method of manufacturing a rotor assembly for a dynamo electric machine comprising, starting with a rotor core including a plurality of circumferentially spaced radially extending poles encircled by respective rotor windings, a respective spacer received in the gap between the windings of each circumferentially adjacent pair of windings, a respective closure member circumferentially spanning the gap between the poles of each adjacent pair of poles, each closure member including lateral flanges received between a respective winding and the underside of a respective circumferentially extending pole tip, and the method including introducing a respective locking wedge assembly between each spacer and its associated closure, each locking wedge assembly comprising first and second elongate tapering wedges with their tapers extending in opposite directions axially of the rotor assembly, said first and second wedges having their taper arranged radially of the rotor assembly, the first wedge having a face in contact with the respective closure member, the second wedge having a face in contact with the respective spacer, and the two wedges having their opposite face in sliding contact, and, driving the wedges axially of the rotor assembly to move their wider ends towards the transverse median plane of the rotor assembly so as to urge the respective closure member and the respective spacer radially apart.

9. A method as claimed in claim 8 wherein the locking wedges are each received in respective elongate oppositely facing channels formed in a respective elongate alignment member interposed between the respective closure member and spacer, and are in sliding contact with one another through the intermediary of a dividing wall of the alignment member.

10. A method as claimed in claim 8 wherein said closure members and said spacers are equal in length to the axial length of the poles of the rotor core, and said first and second locking wedges are initially of a length exceeding the axial length of the poles, the dimensions of the wedges, the closure members and the spacers being such that the first and second wedges are inserted substantially completely through the axial length of the rotor before significant radial force is applied to the respective spacer and closure member, the wedges then being pressed further to load the respective spacer and the respective closure member radially apart and subsequently trimming the protruding regions of the first and second wedges, at both axial ends of the rotor assembly, to be substantially flush with the axial ends of the spacers and closure members.

11. A method as claimed in claim 8 wherein a wedge insertion apparatus applies a predetermined force simultaneously to the wider ends of the first and second wedges of each wedge assembly to drive the wider ends of the first and second wedges towards one another, the predetermined force applied simultaneously to both wedges being calculated to move the wedges to a position in which a predetermined desired radial loading is applied to the respective spacer and closure member.

12. A method as claimed in claim 8 wherein a single wedge shaped blank is cut to produce substantially identical first and second wedges.

* * * * *